(12) United States Patent
Smirnov et al.

(10) Patent No.: US 8,299,665 B2
(45) Date of Patent: Oct. 30, 2012

(54) MOTOR

(75) Inventors: Viatcheslav Smirnov, Suwon-si (KR); Sang-Kyu Lee, Suwon-si (KR)

(73) Assignee: Samsung Electro-Mechanics Co., Ltd., Gyunggi-do (KR)

(*) Notice: Subject to any disclaimer, the term of this patent is extended or adjusted under 35 U.S.C. 154(b) by 285 days.

(21) Appl. No.: 12/772,432

(22) Filed: May 3, 2010

(65) Prior Publication Data
US 2011/0127865 A1 Jun. 2, 2011

(30) Foreign Application Priority Data
Nov. 30, 2009 (KR) .................. 10-2009-0116729

(51) Int. Cl.
*H02K 5/16* (2006.01)
(52) U.S. Cl. ........................ 310/67 R; 310/90
(58) Field of Classification Search .......... 310/89, 310/90, 67 R
See application file for complete search history.

(56) References Cited

U.S. PATENT DOCUMENTS

| | | | | |
|---|---|---|---|---|
| 5,536,088 A | * | 7/1996 | Cheever et al. | 384/107 |
| 6,069,429 A | * | 5/2000 | Yamamoto et al. | 310/90 |
| 6,145,377 A | * | 11/2000 | Nakasugi et al. | 73/483 |
| 6,685,356 B2 | * | 2/2004 | Hirata | 384/100 |
| 6,717,308 B2 | * | 4/2004 | Chen et al. | 310/90 |
| 7,015,611 B2 | * | 3/2006 | Tokunaga et al. | 310/90 |

* cited by examiner

*Primary Examiner* — Dang Le
(74) *Attorney, Agent, or Firm* — McDermott Will & Emery LLP

(57) ABSTRACT

A motor is disclosed. The motor in accordance with an embodiment of the present invention includes a base, a shaft, which has an end part coupled to the base, a housing, which has a hollow part formed therein in such a way that the shaft rotatably supports the housing and in which the other end part of the base is inserted into the hollow part, and a rotor case, which includes an insertion hole and a supporting wall. The insertion hole has the housing inserted therein, and the supporting wall supports an outer circumferential surface of the inserted housing.

13 Claims, 10 Drawing Sheets

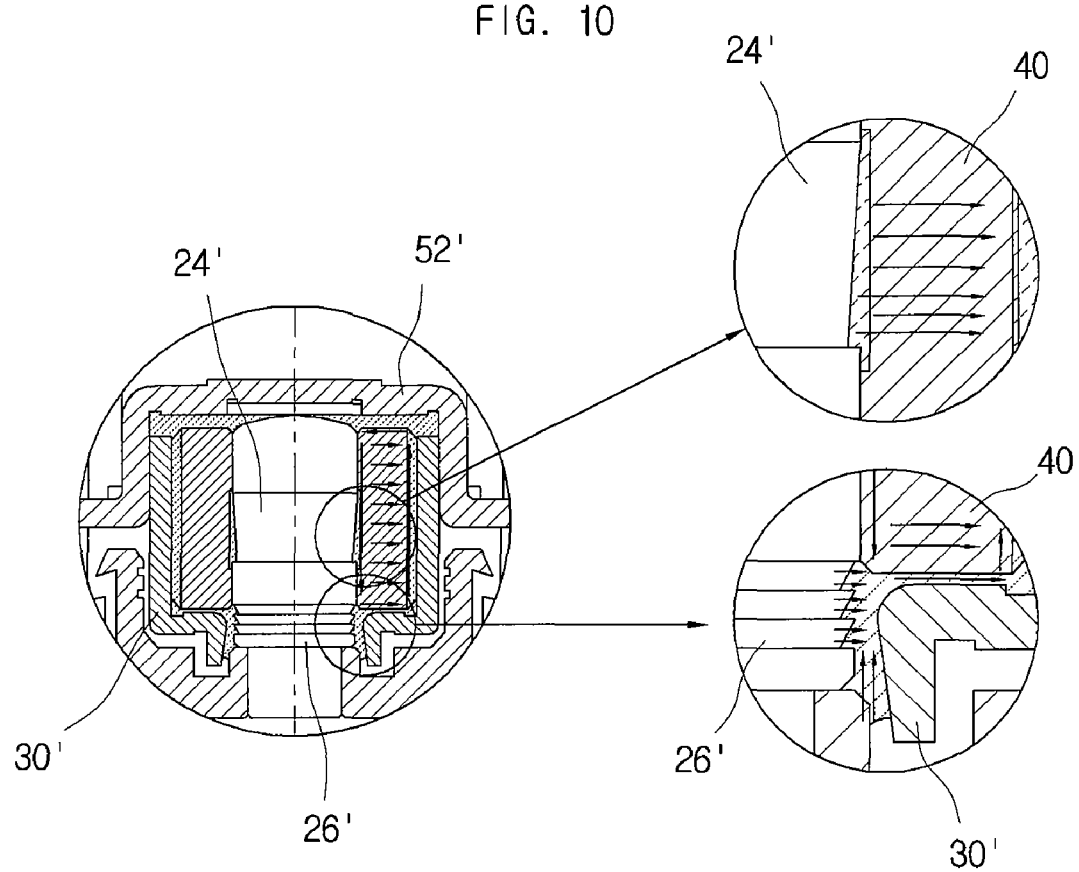

MOTOR

CROSS-REFERENCE TO RELATED APPLICATIONS

This application claims the benefit of Korean Patent Application No. 10-2009-0116729, filed with the Korean Intellectual Property Office on Nov. 30, 2009, the disclosure of which is incorporated herein by reference in its entirety.

BACKGROUND

1. Technical Field

The present invention is related to a motor.

2. Description of the Related Art

Spindle motors are commonly used in electronic products, for example, computer drives, which require a precision rotation device. The spindle motors are extremely promising because, despite their small size, they can be rotated at a high speed with less power and can be readily controlled with high precision.

In a conventional motor, a rotor coupled to a rotational axis is supported by a stator to rotate.

However, as the conventional spindle motor becomes thinner, the section of the stator for supporting the rotational axis becomes smaller, making it difficult to provide reliability of rotation in a thin spindle motor.

SUMMARY

The present invention provides a thinner motor that can rotate with reliable stability.

An aspect of the present invention provides a motor that includes a base, a shaft, which has an end part coupled to the base, a housing, which has a hollow part formed therein in such a way that the shaft rotatably supports the housing and in which the other end part of the base is inserted into the hollow part, and a rotor case, which includes an insertion hole and a supporting wall. The insertion hole has the housing inserted therein, and the supporting wall supports an outer circumferential surface of the inserted housing.

The rotor case can include a through-hole shaped insertion hole, which has the housing inserted therein, and a supporting wall, which is protruded on a circumference of the insertion hole so as to support an outer circumferential surface of the housing.

The rotor case can include an insertion groove, which is formed in a depressed portion of the rotor case to correspond to an outer shape of the housing and in which the insertion groove has the insertion hole and the supporting wall.

The motor can further include a thrust washer, which is installed in the insertion groove and supports the shaft. The housing can include a hollow part opened toward the rotor case.

The housing can include a shaft hole, which opens the hollow part toward the base, and an oil leak prevention wall, which is protruded toward the outside of the housing along a circumference of the shaft hole to surround the shaft and in which an inner diameter of the oil leak prevention wall expands toward an outer side.

The oil leak prevention wall can be tapered to expand an inner diameter of the oil leak prevention wall.

The motor can further include a porous bearing, which is interposed between the shaft and the housing and in which the porous bearing has a porous structure so that oil can pass through the porous bearing.

A circulation groove can be formed on an outer circumferential surface of the porous bearing, in which the oil circulates through the circulation groove.

An oil return groove can be formed on an outer circumferential surface of the shaft inserted into the housing. The oil return groove can include a flange facing a direction of circulation of the oil.

The oil return groove can be disposed adjacent to a lower end part of the porous bearing.

The base can include a base plate, which has a through-hole formed therein, and a supporter, which is inserted into and coupled to the base plate and coupled to an end part of the shaft.

The supporter can have a facing surface surrounding the housing, and an oil leak prevention groove can be formed on the facing surface.

The supporter can be coupled to the through-hole of the base plate by way of caulking or snug fitting.

Additional aspects and advantages of the present invention will be set forth in part in the description which follows, and in part will be obvious from the description, or may be learned by practice of the invention.

BRIEF DESCRIPTION OF THE DRAWINGS

FIG. 10 shows how oil circulates in a motor in accordance with another embodiment of the present invention.

DETAILED DESCRIPTION

The features and advantages of this invention will become apparent through the below drawings and description.

Figure 1:
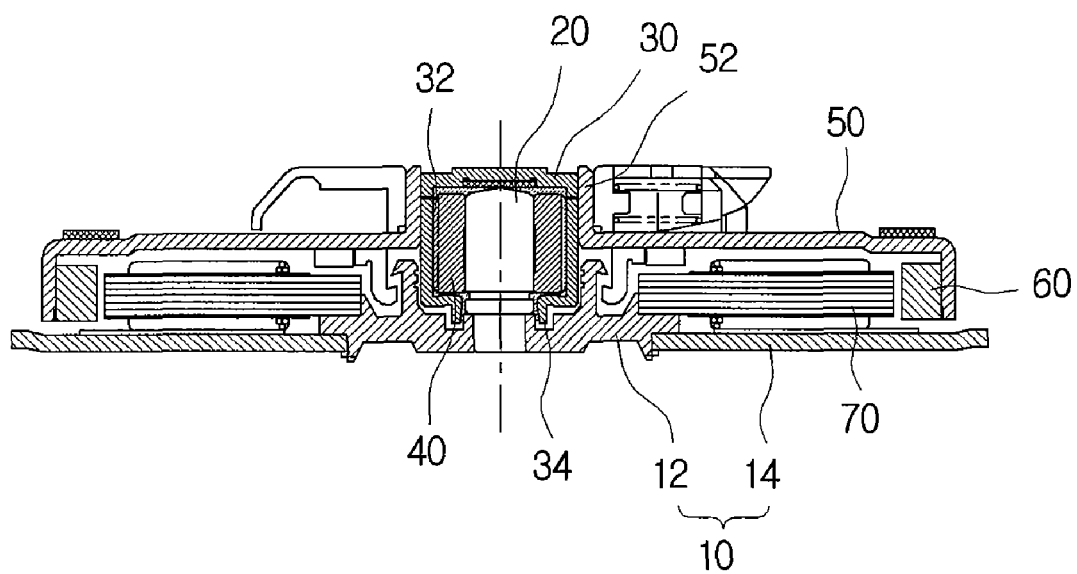
FIG. 1 is a cross-sectional view of a motor in accordance with an embodiment of the present invention.
Figure 2:
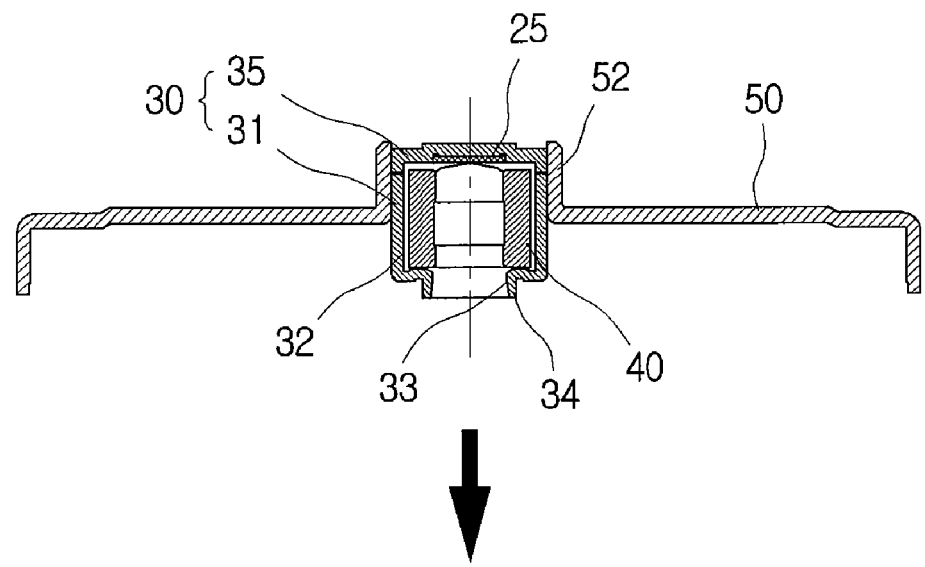
FIGS. 2 and 3 are exploded views of a motor in accordance with an embodiment of the present invention.
Figure 2:
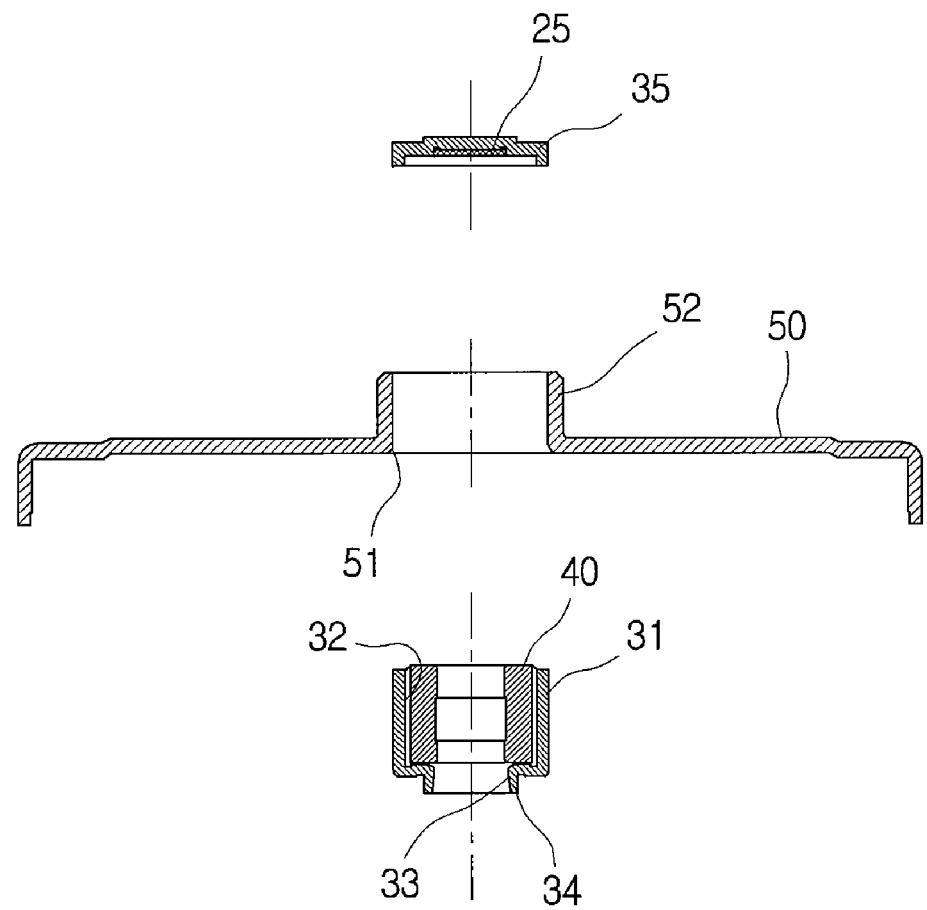
Figure 3:
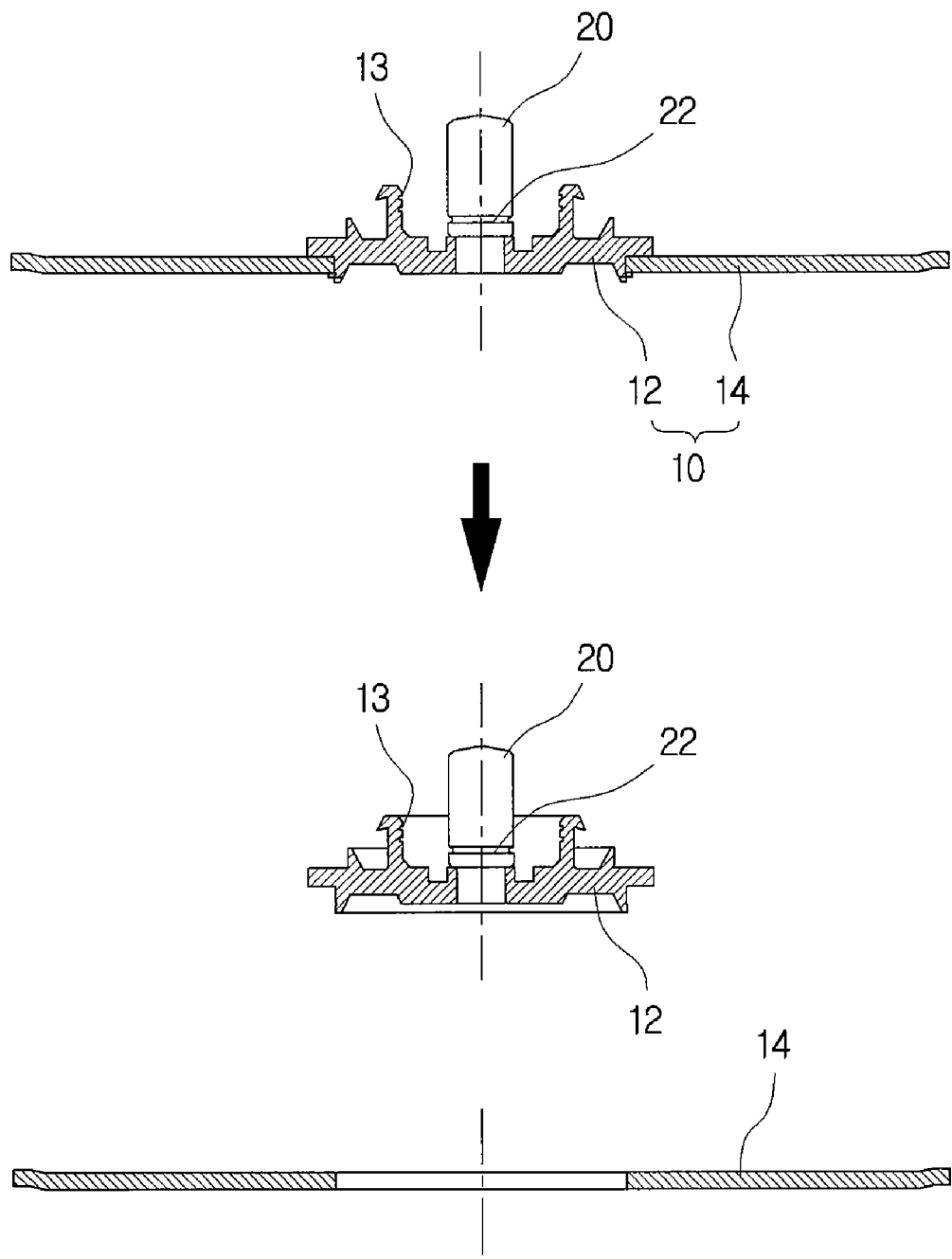

FIG. 1 is a cross-sectional view of a motor in accordance with an embodiment of the present invention, and FIGS. 2 and 3 are exploded views of a motor in accordance with an embodiment of the present invention.

The motor in accordance with an embodiment of the present invention includes a base 10, a shaft 20, a housing 30 and a rotor case 50. The motor of the present embodiment can include an electromagnet 70 and a permanent magnet 60 in order to generate a rotational force by using a magnetic force.

The base 10 supports the entire motor and is coupled to an end part of the shaft 20 that supports the housing 30 and the rotor case 50, which will be described later.

The base 10 of the present embodiment can include a base plate 14 and a supporter 12 coupled to the base plate 14. Specifically, as illustrated in FIG. 3, the base plate 14 has a through-hole formed therein, and the supporter 12 can be coupled to the base plate 14 by being inserted into the through-hole. Then, an end part of the shaft 20 is coupled to the supporter 12.

Figure 9:
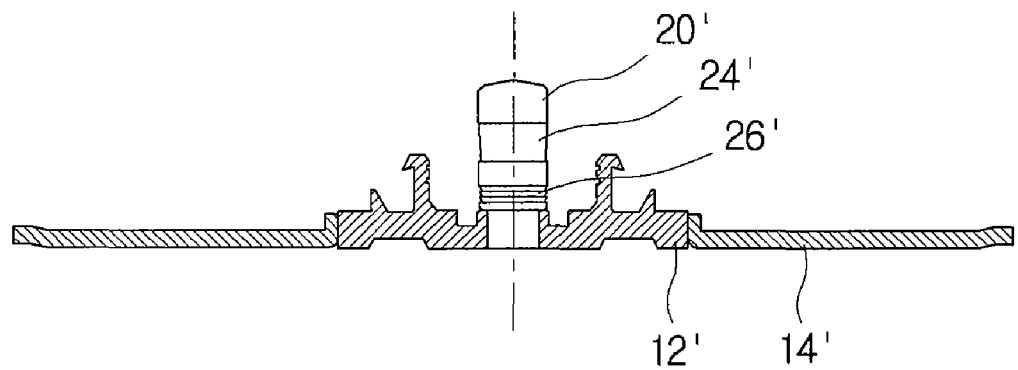
Figure 9:
Figure 9:
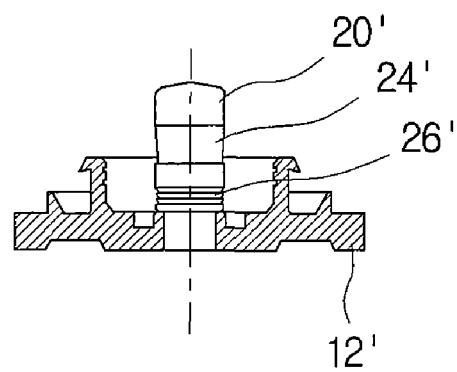
Figure 9:
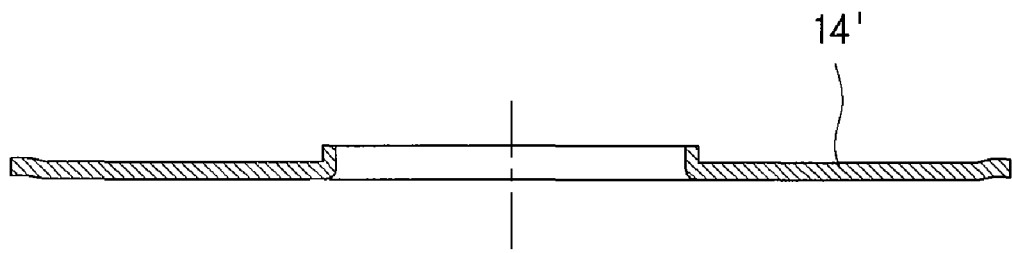

Here, coupling of the supporter 12 and 12' to the base plate 14 and 14' can be performed by various known methods such as caulking or snug fitting, as illustrated in FIG. 9.

The shaft 20 rotatably supports the housing 30 and the rotor case 50, which are rotating bodies, and is supported by having an end part of the shaft 20 coupled to the base 10. The shaft 20 of the present embodiment is supported by the base 10 by being coupled to the supporter 12.

The housing 30 and the rotor case 50 are coupled to each other and become a rotating body that rotates about the center of the shaft 20.

For this, the housing 30 has a hollow part 32, into which the other end part of the shaft 20 is inserted, formed therein, and the rotor case 50 has an insertion hole 51, to which the housing 30 is inserted and coupled, formed therein. In this configuration, the motor of the present embodiment can have a structure in which the shaft 20 supports and rotates a rotating body that is formed by the housing 30 and the rotor case 50.

Figure 6:
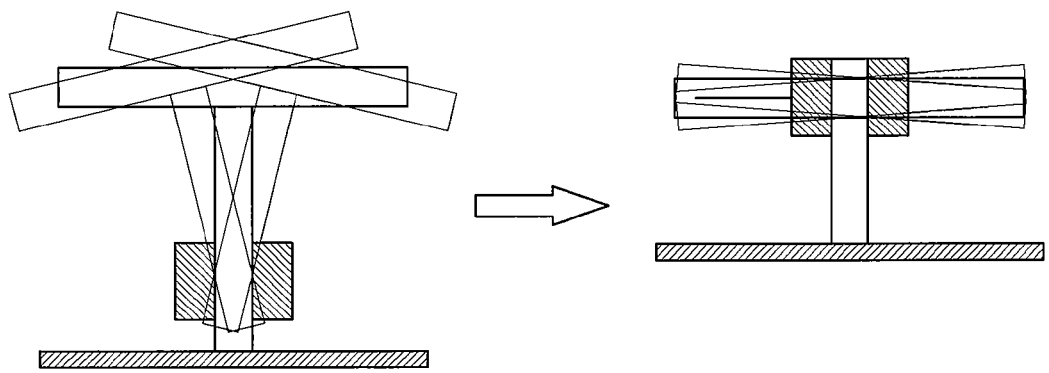
FIG. 6 shows a property of a motor in accordance with an embodiment of the present invention.

FIG. 6 shows a property of a motor in accordance with an embodiment of the present invention.

As illustrated in FIG. 6, the structure in which the shaft 20 supports and rotates the rotating body minimizes the deviation in vibration when the rotating body rotates, compared to a conventional rotating body, which rotates together with a rotational axis as a single body. Thus, with the same length of a rotating body supporting area as that of the convention motor, the motor of the present embodiment can stably support a rotating body.

Particularly, the motor of the present embodiment can allow the housing 30 and shaft 20 lengthy such that the rotating body can be supported more stably even in a thinner structure.

For this, an outwardly-protruded supporting wall 52, which supports the housing 30, is formed in the center of the rotor case 50. As a result, while the height of the supporting surface, which supports an object to be rotated (not shown), for example, a disk, of the rotor case 50 can be decreased, a sufficient length of the housing 30 that supports the shaft 20 can be obtained.

Furthermore, the supporting wall 52 of the rotor case 50 can also function to readily align the rotational center of the motor. In the conventional motor, a rotational axis is directly coupled to the rotor case 50, and thus it is difficult to make the rotor case 50 perpendicular to the rotational axis. Conversely, in the motor of the present embodiment, since the housing 30 having a relatively wider diameter is coupled to the rotor case 50, it becomes easier to make the rotor case 50 perpendicular to the housing 30, allowing an easier assembly of the rotor case 50 with the housing 30.

Specifically, as illustrated in FIG. 2, the through-hole shaped insertion hole 51, into which the housing 30 is inserted, can be formed in the rotor case 50, and the supporting wall 52 can be formed to protrude along the circumference of the insertion hole 51 so as to support an outer circumferential surface of the housing 30.

Figure 7:
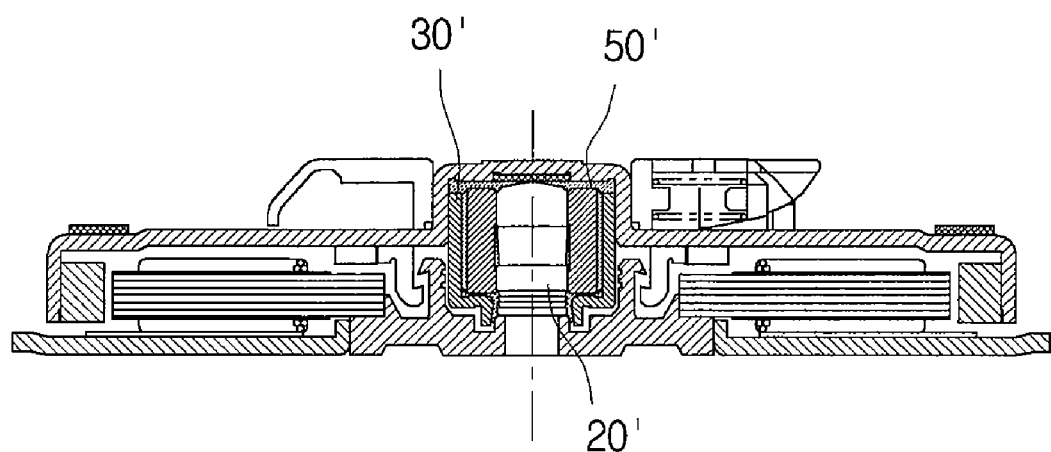
FIG. 7 is a cross-sectional view of a motor in accordance with another embodiment of the present invention.
Figure 8:
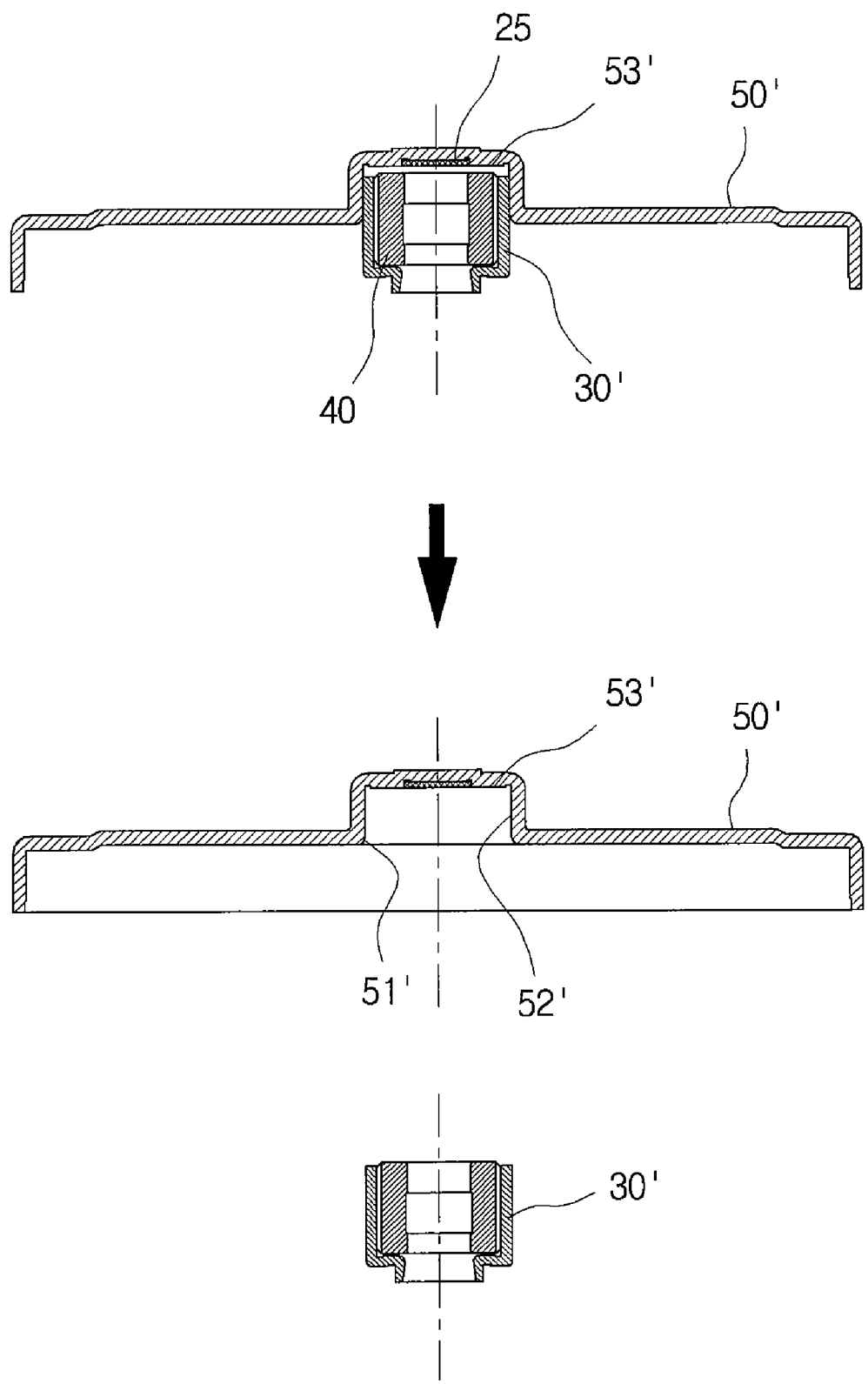
FIGS. 8 and 9 are exploded views of a motor in accordance with another embodiment of the present invention.

Furthermore, as illustrated in FIGS. 7 and 8, an insertion groove 53' can be formed in a depressed portion of a rotor case 50' to correspond to the outer shape of a housing 30'. Accordingly, the entrance of the insertion groove 53' becomes an insertion hole 51', and an inner surface of the insertion groove 53' becomes a supporting wall 52'.

Here, a lower surface of the insertion groove 53' can also function to support a shaft 20'. Specifically, a thrust washer 25 supporting the shaft 20' can be installed on the lower surface of the insertion groove 53', and the hollow part of the housing 30' can be opened toward the rotor case 50'. Thus, the shaft 20' having penetrated through the housing 30' can be supported by the insertion groove 53' having the thrust washer 25 installed therein, thereby simplifying the configuration and assembly of the housing 30'.

Meanwhile, in the housing 30 of the present embodiment, oil can be filled in the hollow part 32 for smooth rotation of the housing 30, and an oil leak prevention wall 34 can be additionally formed around the entrance of the hollow part 32 in order to prevent the filled oil from leaking.

Figure 4:
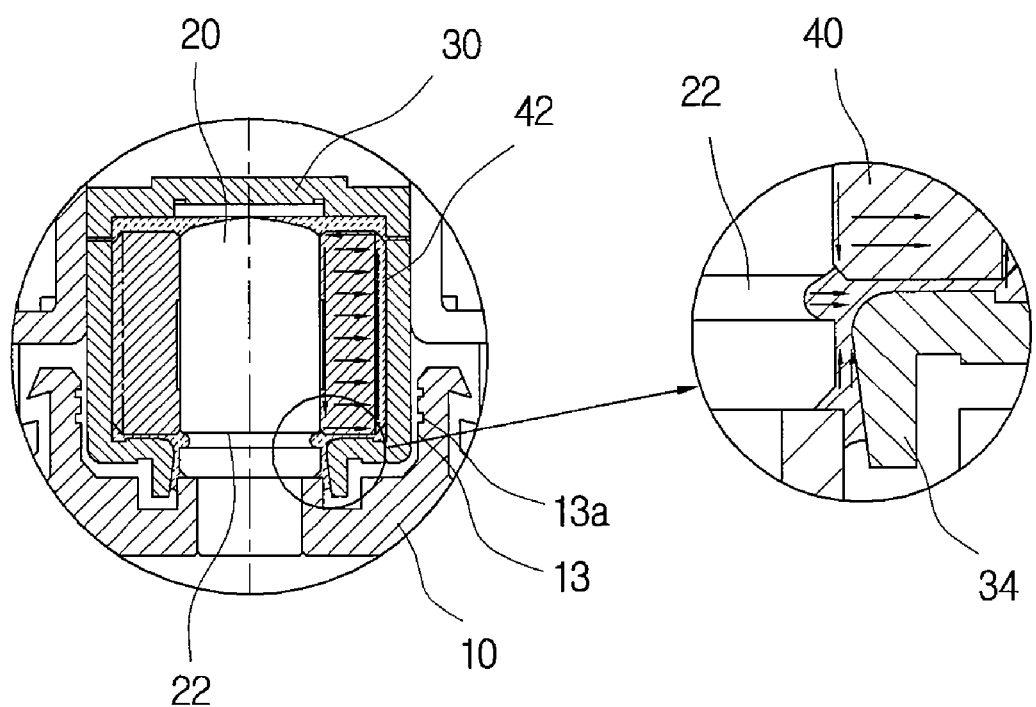
FIGS. 4 and 5 show how oil circulates in a motor in accordance with an embodiment of the present invention.
Figure 5:
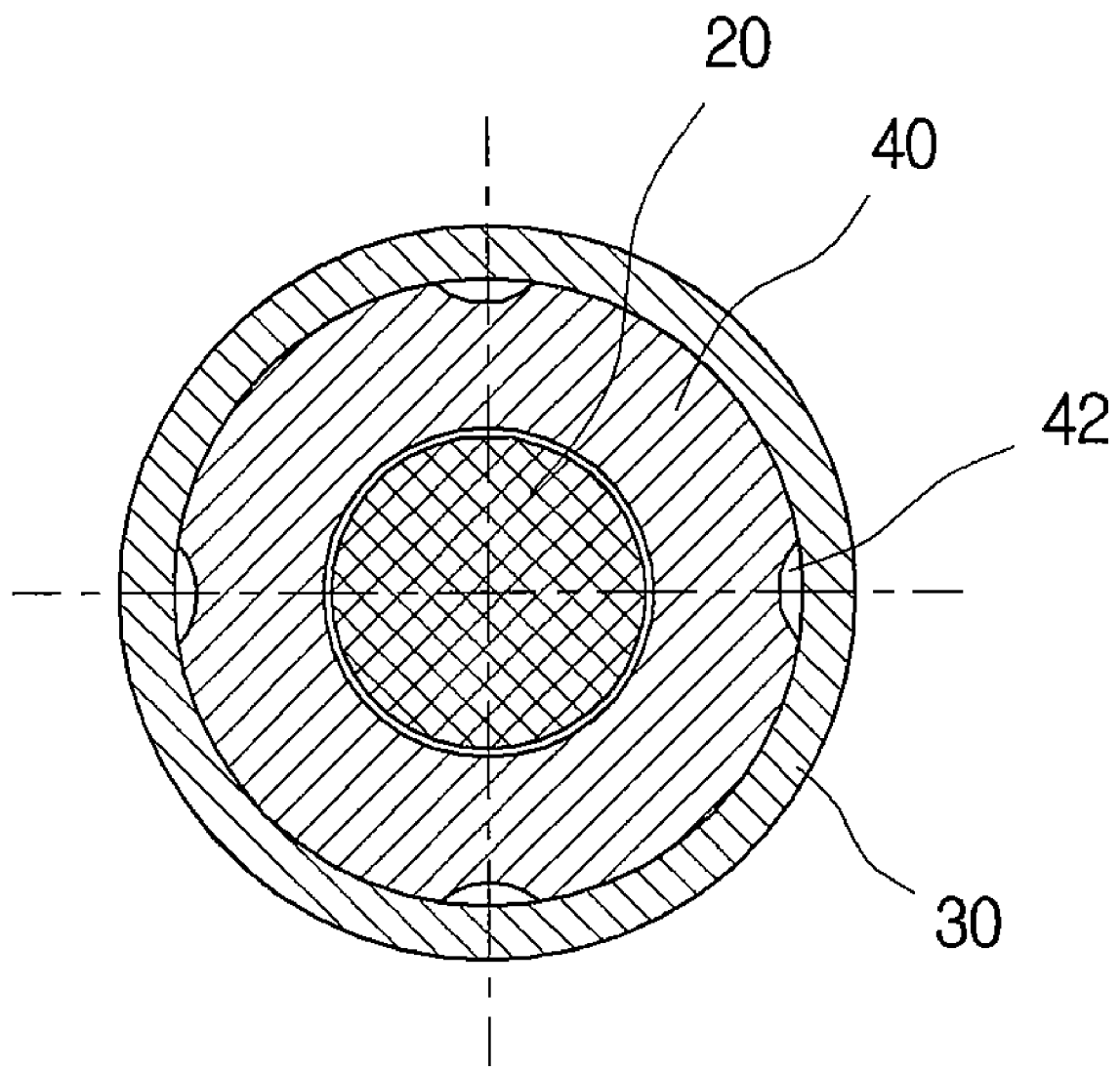

FIGS. 4 and 5 show how oil circulates in a motor in accordance with an embodiment of the present invention.

As illustrated in FIGS. 2 and 4, a shaft hole 33 opening the hollow part 32 toward the base 10 is formed in the housing 30 of the present embodiment. Then, the oil leak prevention wall 34, which surrounds the shaft 20 by being protruded toward the outside of the housing 30 and has a wider inner diameter toward an outer side, can be additionally formed along the circumference of the shaft hole 33. Specifically, the oil leak prevention wall 34 can be tapered to expand the inner diameter toward the outside.

Therefore, the oil filled in the housing 30 can be prevented from leaking to the outside of the housing 30 by an interface that is formed by the oil leak prevention wall 34.

Furthermore, in the motor of the present embodiment, a porous bearing 40 can be interposed between the shaft 20 and the housing 30, allowing the motor to rotate more smoothly. Since a large number of continuously formed spaces are formed in the porous bearing 40, for example, a sintered bearing, oil can be filled in or passed through the porous bearing 40. Accordingly, as illustrated in FIG. 4, by using a centrifugal force to circulate the oil when the motor rotates, friction between the shaft 20 and the porous bearing 40 can be minimized.

For smooth circulation of the oil, a circulation groove 42, through which oil circulates, can be formed on an outer circumferential surface of the porous bearing 40 so that the oil pushed toward the outside of the porous bearing 40 by the centrifugal force can be fed back.

Also, an oil return groove 22 can be formed on an outer circumferential surface of the shaft 20 in order to prevent the oil from gravitating toward the entrance of the hollow part 32 by, for example, the gravity. As illustrated in FIG. 4, the oil having flowed along the space between the porous bearing 40 and the shaft 20 can be guided to the inside of the porous bearing 40 because the oil can flow along the oil return groove 22.

By disposing the oil return groove 22 adjacent to a lower end part of the porous bearing 40, the oil having passed through the porous bearing 40 can be also prevented from leaking to the outside of the housing 30.

Particularly, as illustrated in FIG. 10, by forming a flange that faces the direction of circulation of the oil on oil return grooves 24' and 26', the amount of the oil guided to the inside of the porous bearing 40 can be increased, and the oil can be further prevented from flowing to the outside of the housing 30'. Specifically, an oil return groove 24' having a bigger flange facing the direction of circulation of the oil can be formed in a center portion of the shaft 20 in such a way that a large amount of the oil can be guided to the inside of the porous bearing 40. Then, a plurality of oil return grooves 26', in a shape of wrinkles, having flanges facing the direction of circulation of the oil can be formed in an area adjacent to a lower end part of the porous bearing 40 in such a way that the oil can be prevented from flowing to the outside of the housing 30'.

Furthermore, as illustrated in FIG. 4, in order to prevent the oil that is leaked from the housing 30 to the outside from being scattered, a facing surface 13 surrounding the housing

30 can be formed on the supporter 12, and an oil leak prevention groove 13a can be formed on the facing surface 13.

By utilizing certain embodiments of the present invention as set forth above, a sufficient area for supporting a rotating body can be provided even in a thinner structure.

Furthermore, alignment and assembly of a rotational center can be performed more easily.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

As such, many embodiments other than those set forth above can be found in the appended claims.

What is claimed is:

1. A motor comprising:
    a base;
    a shaft having an end part coupled to the base;
    a housing having a hollow part formed therein in such a way that the shaft rotatably supports the housing, the other end part of the shaft being inserted into the hollow part; and
    a rotor case comprising an insertion hole and a supporting wall, the insertion hole having the housing inserted therein, the supporting wall configured to support an outer circumferential surface of the inserted housing,
    wherein the housing comprises:
        a shaft hole opening the hollow part toward the base; and
        an oil leak prevention wall protruded toward the outside of the housing along a circumference of the shaft hole to surround the shaft, an inner diameter of the oil leak prevention wall expanding toward an outer side.

2. The motor of claim 1, wherein the rotor case comprises:
    a through-hole shaped insertion hole having the housing inserted therein; and
    a supporting wall protruded on a circumference of the insertion hole so as to support an outer circumferential surface of the housing.

3. The motor of claim 1, wherein the rotor case comprises an insertion groove formed in a depressed portion of the rotor case to correspond to an outer shape of the housing, the insertion groove having the insertion hole and the supporting wall.

4. The motor of claim 3, further comprising:
    a thrust washer installed in the insertion groove and configured to support the shaft,
    wherein the housing comprises a hollow part opened toward the rotor case.

5. The motor of claim 1, wherein the oil leak prevention wall is tapered to expand an inner diameter of the oil leak prevention wall.

6. The motor of claim 1, further comprising:
    a porous bearing interposed between the shaft and the housing, the porous bearing having a porous structure so that oil can pass through the porous bearing.

7. The motor of claim 6, wherein a circulation groove is formed on an outer circumferential surface of the porous bearing, the oil circulating through the circulation groove.

8. The motor of claim 6, wherein an oil return groove is formed on an outer circumferential surface of the shaft inserted into the housing.

9. The motor of claim 8, wherein the oil return groove comprises a flange facing a direction of circulation of the oil.

10. The motor of claim 9, wherein the oil return groove is disposed adjacent to a lower end part of the porous bearing.

11. The motor of claim 1, wherein the base comprises:
    a base plate having a through-hole formed therein; and
    a supporter inserted into and coupled to the base plate and coupled to an end part of the shaft.

12. The motor of claim 11, wherein the supporter has a facing surface surrounding the housing, and an oil leak prevention groove is formed on the facing surface.

13. The motor of claim 11, wherein the supporter is coupled to the through-hole of the base plate by way of caulking or snug fitting.

* * * * *